Figure 6:
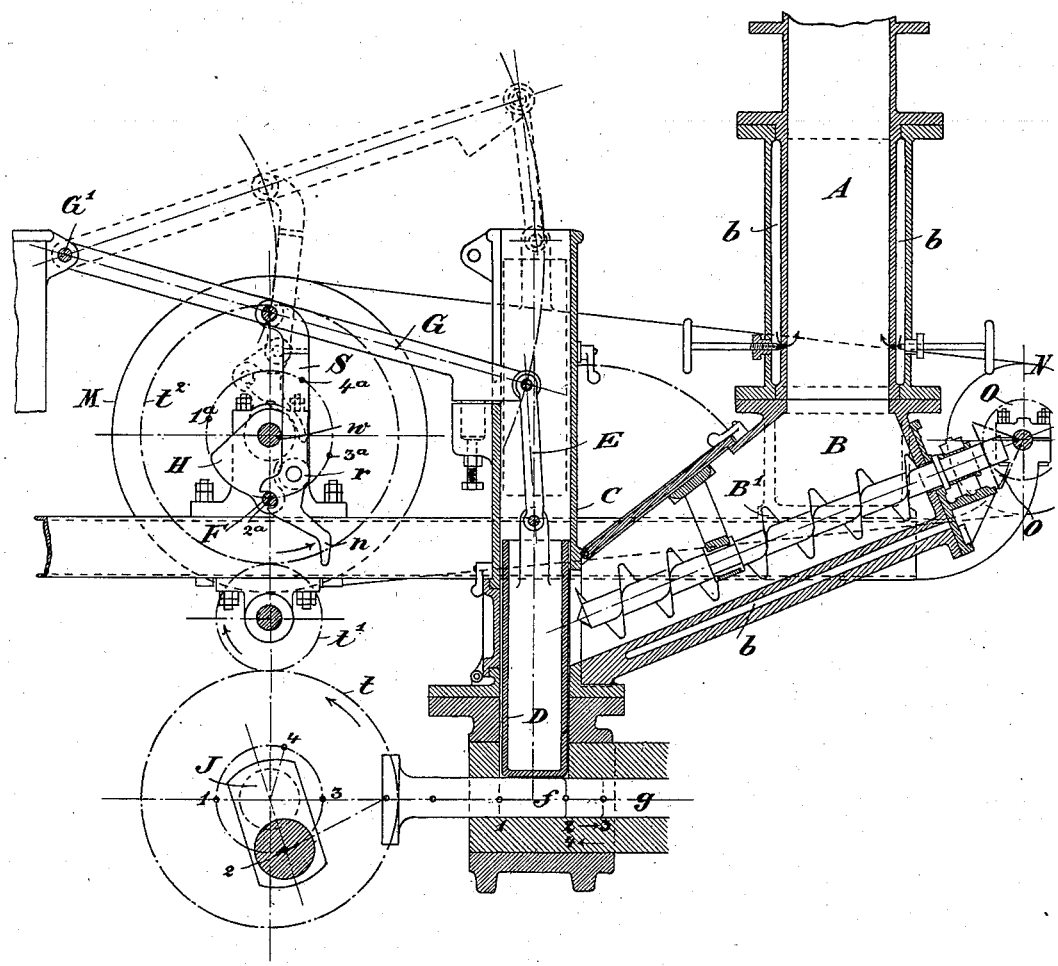

No. 657,607. Patented Sept. 11, 1900.
C. LUZATTO.
APPARATUS FOR FORMING CAKES OF FOOD FOR CATTLE, &c.
(Application filed Dec. 9, 1897.)
(No Model.) 3 Sheets—Sheet 1.
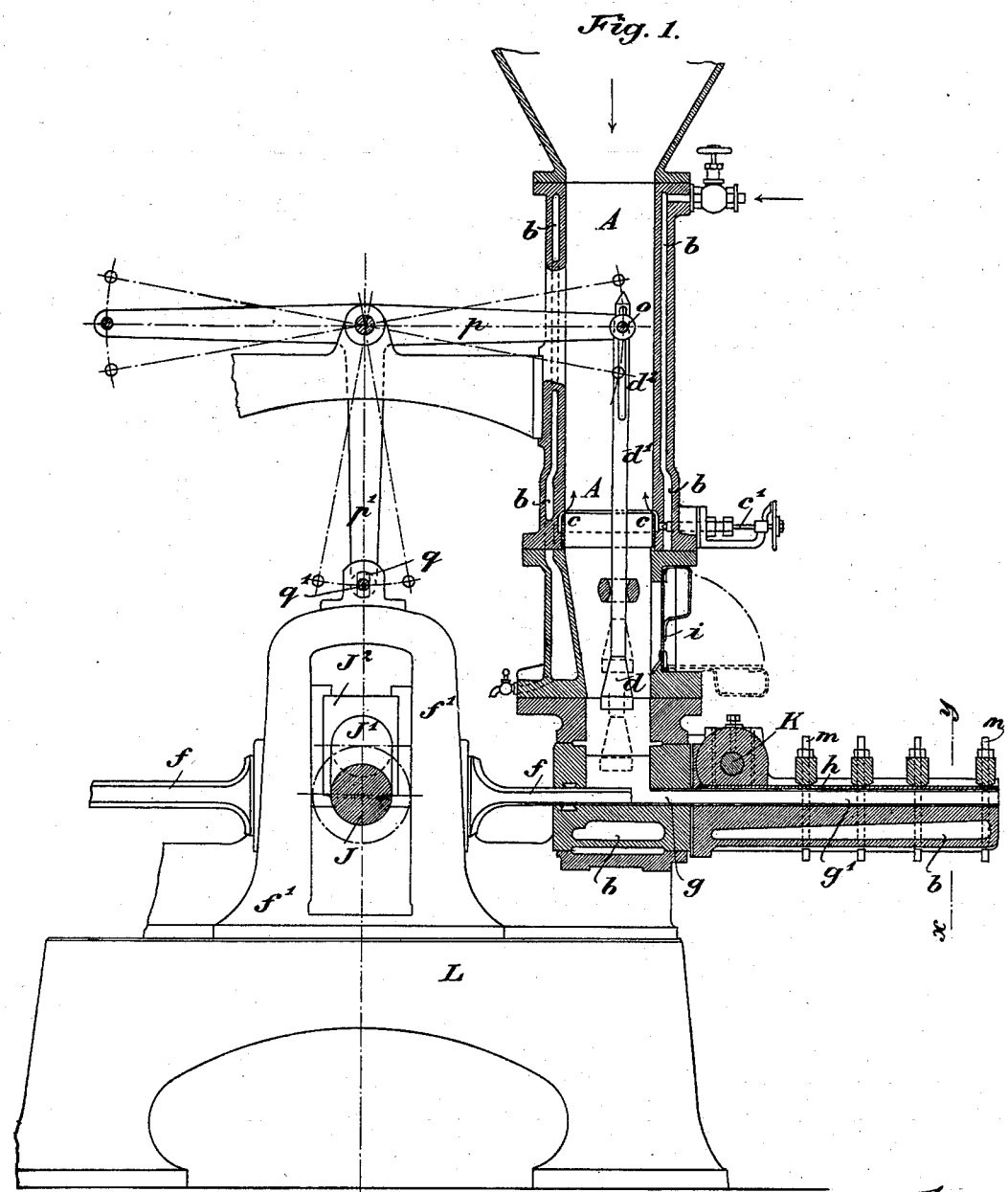

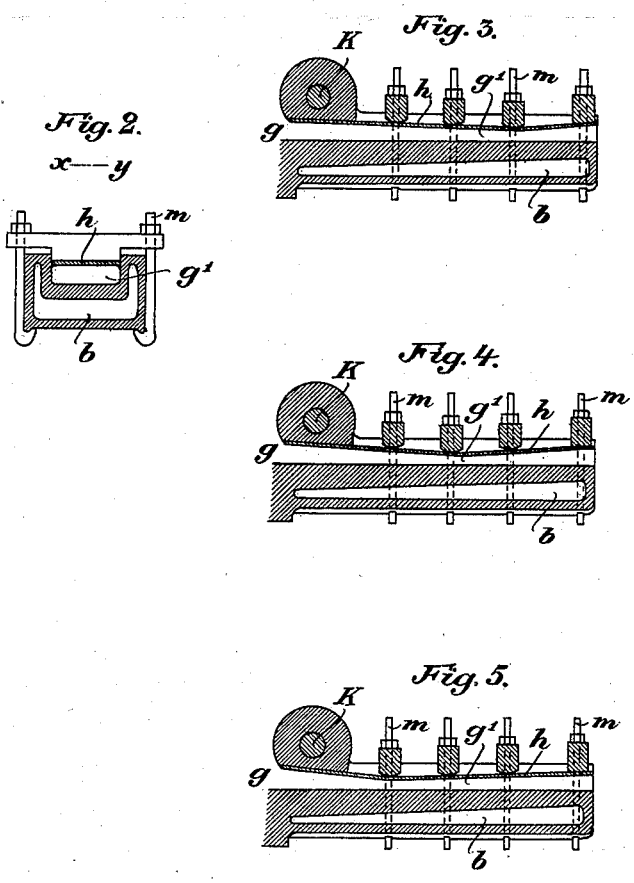

No. 657,607. Patented Sept. 11, 1900.
C. LUZATTO.
APPARATUS FOR FORMING CAKES OF FOOD FOR CATTLE, &c.
(Application filed Dec. 9, 1897.)
(No Model.) 3 Sheets—Sheet 3.

Attest:
A. L. Kent
J. F. Kehoe

Inventor
Cesare Luzzatto
By Philipp, Phelps & Langer
Attys

UNITED STATES PATENT OFFICE.

CESARE LUZATTO, OF MILAN, ITALY, ASSIGNOR OF ONE-HALF TO THE FIRM EISENWERK, VORMALS NAGEL & KAEMP, ACTIEN-GESELLSCHAFT, OF HAMBURG, GERMANY.

APPARATUS FOR FORMING CAKES OF FOOD FOR CATTLE, &c.

SPECIFICATION forming part of Letters Patent No. 657,607, dated September 11, 1900.

Application filed December 9, 1897. Serial No. 661,246. (No model.)

*To all whom it may concern:*

Be it known that I, CESARE LUZATTO, engineer, a subject of the Emperor of Austria-Hungary, residing at Milan, Italy, have invented new and useful Improvements in Apparatus for the Manufacture of Cakes of Food for Cattle and the Like, (for which I have obtained a patent in Belgium, No. 118,383, bearing date November 16, 1895; in Great Britain, No. 21,841, bearing date November 16, 1895; in France, No. 251,713, bearing date November 14, 1895; in Italy, Vol. LXXV, No. 380, bearing date March 25, 1895, and Vol. LXXIX, No. 28, bearing date November 20, 1895; in Austria, Vol. XXXXV, No. 2,906, bearing date August 19, 1895, and Vol. XXXXV, No. 4,674, bearing date December 6, 1895; in Hungary, No. 2,871, bearing date June 4, 1895, and No. 4,760, bearing date December 6, 1895; in Switzerland, No. 11,566, bearing date November 16, 1895, and in Germany, No. 88,370, bearing date November 17, 1895;) and I do hereby declare that the following is a full, clear, and exact description of the invention, which will enable others skilled in the art to which it appertains to make and use the same.

This invention relates to the manufacture of food for cattle and the like, such food being made in the shape of cakes and composed chiefly of fibrous substances; and the object of this invention is to improve the apparatus to be employed in making cakes of this and similar kinds of food, the cakes being of a composition calculated to meet every requirement for the successful feeding of cattle and the like and being capable of resisting for a long time destructive atmospheric influences.

The cakes produced in accordance with this invention are free from the drawbacks attaching to all cakes for a similar purpose that have been hitherto introduced into the market, their characteristic merits in this respect being great density and a remarkable power for resisting putrefaction and the fact that they may be conveyed from place to place without breaking or crumbling, all of which advantages are mainly the outcome of the novel method of manufacture which my improved apparatus is designed to carry out and in the performance of which the admixture of substances likely to prove in any way injurious to the cattle is carefully avoided.

My apparatus is designed to subject the mixture of the ingredients before it is made into cakes to a preliminary process of moderate compression within a steam-bath, fresh steam being brought into as close contact as possible with all parts of the mixture, so as to render it sufficiently moldable for being in the most simple and direct manner made into the shape of cakes by the compressing or molding operation hereinafter described. It is desirable that the degree of pressure applied in the course of this compressing operation may be varied according to the nature of the ingredients of which the cakes are composed and the special purpose for which they are intended, though the pressure exercised in the "feeding" or longitudinal direction remains uniform, and this result is preferably obtained by so constructing the mouthpiece or channel through which the ingredients are pressed that it is either reduced or enlarged in width by more or less rapid degrees in the course of the operation—say by providing it with a flexible wall for the purpose.

On the annexed sheet of drawings, Figure 1 shows in elevation, partly in section, a machine or press for carrying out this invention. Fig. 2 is a vertical section of the mouthpiece of the press proper, the said section being taken on line $x\,y$ of Fig. 1. Figs. 3, 4, and 5 represent in sections taken at right angles to the section shown in Fig. 2 different forms of the mouthpiece which are obtained by means of a yielding adjustable plate or upper wall of said piece. Fig. 6 is an elevation, partly in section, of a modification of the press proper with a device for the preparatory compression which I consider is better regulated and more effective than that shown in Fig. 1.

As illustrated by Fig. 1, the mixture to be compressed, consisting, essentially, of fibrous substances and of ground or divided cereals, as above indicated, is introduced by any suitable or well-known means into a suitable channel or chamber A, in which heat is caused to act upon the ingredients. This heat may be applied by a steam-jacket $b$, for example. The mixture sags down in the chamber A by its own weight, and in addition to the external heating it may undergo the direct action of steam, the supply of which should be kept under strict control and the object of which is to permeate and soften the said ingredients, so as to render the mixture sufficiently moldable to insure the delivery from the press of cakes of the desired shape and consistency. The steam is preferably admitted into the lower half of the charging inlet or hopper, or it may enter the space or chamber wherein the first compressing operation takes place. As soon as admitted the steam should be caused to diffuse as widely as possible in all directions, which end may be obtained by an annular mouthpiece $c$ or other suitable orifice, the entrance of steam from the jacket $b$ to the said orifice $c$ being regulated by means of a valve arranged at the end of a screw-threaded spindle $c'$. From the chamber A, in which the material is to be submitted to the preparatory compression, the said material is conveyed to the pressure-chamber or mold proper, which may be done by any convenient means—such, for example, as a plunger or die $d$, a conveyer-screw, as shown in Fig. 6, feeding-rollers, or the like. Where a die $d$ is employed, as illustrated in Fig. 1, I prefer to impart motion to it by an oscillating lever $p$, having a pin $o$ at its end engaging with a slot $d^2$ in the rod $d'$ of the die. Thus the downward movement of die $d$ is rendered independent of that of the lever-arm $p$, and within certain limits a free fall of the die $d$ is secured.

The pressure-chamber $g$ or mold proper immediately adjoins the hereinbefore-described preliminary compressing device, and it may be a single or a double acting plunger-press, the plunger or plungers $f$ of which receives or receive a reciprocating motion by means of the crank $J'$ of a crank-shaft $J$, a sliding piece $f'$ being held in and guided by the frame L of the machine or apparatus and having guides for the crank pillow-block $J^2$ to slide in vertically. The said piece $f'$ is caused to reciprocate with the plunger $f$ or plungers fastened thereon and by means of a slot $q$ imparts its motion to the pin $q'$ of the lever-arm $p'$, formed with or secured to the lever $p$. This press is adapted for continuous operation, and its delivery channel or orifice $g'$ is so constructed that, by means of a yielding adjustable cover-plate, or lid $h$, arranged to turn upon the pivot K, its sectional area can be varied by means of screw-clamps $m$, and, when required, both the chamber $g\ g'$, wherein the final compression takes place, as well as that, A, in which the mixture of ingredients undergoes preparatory pressure, is or are provided with a steam-jacket $b$ to suit the particular nature or purpose of the material to be molded. In Figs. 1, 3, 4, and 5 the yielding cover-plate $h$ is represented in four different positions, produced by suitably adjusting the screw-clamp $m$; but it is evident that by the same means other forms of the longitudinal section of the mouthpiece $g'$ can also be obtained. In order to avoid any obstruction in the chamber A, there is arranged a door $i$ in the side wall thereof, through which the mixture to be treated can be stirred, if required.

Assuming the machine to be in working state, the piston or plunger $f$ pushes that part of the mixture situated in front of it into the orifice $g$, and on moving backward the piston allows the material above it to enter the free space in front of the said piston, and on the said piston moving forward again it pushes a further quantity of the mixture into the orifice $g$; so that in this way the first part of the material is forwarded and compressed repeatedly by the new part meeting it. The degree of reduction of the sectional area of the mouthpiece $g'$ controls the degree of compression of the material, and the described mode of adjusting the said area renders it possible, for example, first to compress the material and then to allow it to expand toward the end of the mouthpiece, as may be desired with regard to the condition of the product required. Thus by controlling the quantities of steam supplied and by submitting the material to more or less powerful preliminary pressure and by regulating, as required, the sectional area of the pressure-chamber or mouthpiece $g'$ cakes of the required weight and density and generally of a satisfactory quality can be produced.

A preliminary compressing operation which I consider is better regulated and more effective than that hereinbefore described may be obtained by means of the modified form of the apparatus shown in Fig. 6. Here instead of a die, such as $d$ in Fig. 1, which conveys the mixture of ingredients to the molding pressure-chamber $g$, a stamp or plunger D is provided and an endless or conveyer screw $B'$ or the like is arranged in the space B in connection with the charging-hopper or feeding-channel A, and these act upon the mixture of ingredients prior to its entering the molding-press proper, $f, g$. The successive strokes of the stamp or plunger D are so timed as to correspond with those of the plunger or piston $f$ of the molding-press proper in such a manner that while the plunger $f$ is performing its effective forward stroke from point 1 to 2 the stamp or plunger D remains stationary and forms part of the sides of the molding-press proper. When the plunger $f$ moves from point 2 to 3 and from 5 back to 4, the auxiliary plunger D, moving in an upward direction, leaves a sufficient space to enable fresh material forwarded by the screw $B'$ to enter below the stamp or plunger D, and the receding plunger $f$ of the molding-press gradually leaves free the space it occupies, and the said stamp or plunger D in descending will perform the preparatory compressing operation, and while it is temporarily arrested on reaching the lowest point of its downward stroke it will again form a stationary wall of the main pressure-chamber g. The preparatory compression effected by the plunger D, which is calculated effectually to promote the main compressing or molding process, may itself be further assisted, if desired, by the feeding or charging device B' in the casing B, the said casing communicating at its larger end with the feeding-channel A and at its smaller end with the casing containing the stamp or plunger D, so that a moderate forcing action is obtained by pressure against the stamp or plunger D. In order to insure the proper relative operation of the plungers f and D, suitable gear-wheels $t\ t'\ t^2$ are interposed between the respective shafts J and w, the former being the driving-shaft, and the step-by-step motion of the stamp or plunger D is derived from the uniformly-revolving shaft w, acting through the medium of a push-rod S, which is raised by the pin F of an eccentric or cam H and soon after passing the upper dead-point is released by a peg or toe n striking against the hub of the cam H and then freely descends toward the lower dead-point $2^a$, at which it remains stationary until after the pin F on the cam H is once more thrown into gear with the recess provided near the lower end of the rod S, which rod S is pivoted to a working beam G, the fulcrum of which is at G'. A connecting-rod E connects the said beam G to the plunger D, this latter therefore partaking of the step-by-step motion imparted to the push-rod S—that is to say, the plunger D after being raised falls freely from its uppermost position (shown in dotted lines) into its lowest position. (Shown in full lines). The stamp or plunger D remains in the said lowest position until the plunger f on moving forward has passed the point 2. This being done, the stamp or plunger D is by the pin F, turning through the points $3^a\ 4^a$, moved upward so far that while the main piston f reciprocates from the point 2 to the point 3 and back to the point 4 the orifice of the conical casing B is being opened for the entrance of the mixture conveyed by the screw B'. The pin F of the cam passes the point $4^a$, and by its further rotation the said pin F carries the rod S with it until the peg n thereof has advanced toward the shaft w or the hub of the cam H, fixed on this shaft. The rod S being thus arrested, the pin F, rotating with the cam H in the direction toward the point $1^a$, leaves the recess of said rod S, and the latter by means of a roll r on the rod S rests upon the periphery of the cam H, and for the time the concentric part of the cam is turning under roll r. The cam having passed the roll r loses its support and the plunger D falls freely. Soon after this the pin F occupies the position $1^a$, which corresponds to point 1 of the plunger f, and the latter propels the cake preparatorily compressed by the plunger D toward the orifice of the main press. On the plunger f arriving at the point 2 the pin F has reached the position $2^a$, and here enters again the recess of the rod S and effects a fresh stroke of the plunger D. A pulley M, mounted on the shaft w, imparts motion to the pulley N and bevel-wheels O O, and so transmits motion to the axis of the conveying-screw B'.

Providing means for preparatory compression, as hereinabove described, enables the main press or mold proper to be supplied with cakes that have been already roughly pressed into shape, so that no portion of the material to be molded into cakes is left a chance of escaping sidewise during the whole of this gradual compressing process, the auxiliary or "preliminary" plunger closing the inlet-orifice until every particle of the material required to form a cake has been safely brought within the stationary walls of the pressure-chamber.

Having fully described my invention, what I desire to claim and secure by Letters Patent of the United States is—

1. In a machine for the manufacture of cakes of food for cattle or the like, the combination of a preliminary pressing device, a feeding-channel communicating with said preliminary pressing device and fitted with a steam-jacket, a main pressure-chamber having an adjustable cover-plate, and a reciprocating plunger for compressing the material in said main pressure-chamber, substantially as described.

2. In a machine for the manufacture of cakes of food for cattle or the like, the combination of a preliminary pressing device having a plunger arranged to fall freely, a feeding-channel communicating with said preliminary pressing device and fitted with an annular steam-inlet c and a steam-jacket b, a main pressure-chamber having an adjustable cover-plate h, and a reciprocating plunger for compressing the material in said main pressure-chamber, substantially as described.

3. The combination of a main pressure-chamber, a preliminary pressure-chamber having a plunger arranged so as to fall freely and to form in its lowest position a wall for the main pressure-chamber, a steam-jacketed feeding-channel communicating with the preliminary pressure-chamber, and a screw conveyer B' mounted in said feeding-channel, substantially as described.

4. The combination of a main pressure-chamber, a preliminary pressure-chamber having a plunger arranged so as to fall freely and to form in its lowest position a wall for the main pressure-chamber, a vertically-arranged steam-jacketed feeding-channel, a feeding-channel extending between the vertically-arranged feeding-channel and the preliminary pressure-chamber, and a screw conveyer B' arranged in said last-mentioned feeding-channel, substantially as described.

5. The combination with a main pressure-chamber, and a preliminary pressure-chamber, of the plunger D mounted to reciprocate in the preliminary pressure-chamber, the beam G connected to the plunger D, the rod S pivotally connected to the beam G, the cam H having a pin F adapted to engage the rod S in its upward movement, a plunger mounted to reciprocate in the main pressure-chamber, and means for reciprocating said plunger and for rotating the cam H in proper relative time, substantially as described.

6. The combination with a main pressure-chamber, and a preliminary pressure-chamber, of the plunger D mounted to reciprocate in the preliminary pressure-chamber and forming in its lowest position a wall for the main pressure-chamber, the hanging rod S having a toe $n$, connections between the rod S and the plunger D, a rotary cam H having a pin F adapted to engage the rod S in its upward movement, a plunger mounted to reciprocate in the main pressure-chamber, and means for reciprocating said plunger and for rotating the cam H in proper relative time, substantially as described.

In testimony whereof I have hereunto set my hand in the presence of two subscribing witnesses.

CESARE LUZATTO.

Witnesses:
HEN. MEEKE,
E. H. L. MUMMENHOFF.